United States Patent
Inagaki et al.

[11] Patent Number: 6,150,056
[45] Date of Patent: Nov. 21, 2000

[54] ALKALINE STORAGE BATTERY AND METHOD FOR PRODUCING AN ELECTRODE USED THEREFOR

[75] Inventors: Toru Inagaki, Kamakura; Hiroki Takeshima, Fujisawa; Kazushige Sugimoto, Odawara; Katsuhiro Okamoto, Toyohashi, all of Japan

[73] Assignee: Matsushita Electric Industrial Co., Ltd., Osaka-Fu, Japan

[21] Appl. No.: 09/054,894

[22] Filed: Apr. 3, 1998

[30] Foreign Application Priority Data

| May 30, 1997 | [JP] | Japan | 9-141962 |
| May 30, 1997 | [JP] | Japan | 9-141964 |
| May 30, 1997 | [JP] | Japan | 9-141967 |

[51] Int. Cl.[7] ............ H01M 4/10; H01M 4/26; H01M 4/52; H01M 4/64; H01M 4/74
[52] U.S. Cl. .......... 429/235; 429/233; 429/236; 429/239; 429/240
[58] Field of Search ............... 429/233–240, 429/244

[56] References Cited

U.S. PATENT DOCUMENTS

| 3,055,963 | 9/1962 | Krebs . | |
| 4,680,100 | 7/1987 | Morin | 204/228 |
| 5,384,216 | 1/1995 | Teraoka et al. . | |

FOREIGN PATENT DOCUMENTS

| 0 723 307 A1 | 7/1996 | European Pat. Off. . | |
| 61-293618 | 12/1986 | Japan . | |
| 634561 | 9/1988 | Japan | H01M 4/62 |
| 08144153 | 6/1996 | Japan . | |
| 08298124 | 11/1996 | Japan . | |
| 2 176 500 | 12/1986 | United Kingdom . | |

*Primary Examiner*—Maria Nuzzolillo
*Assistant Examiner*—Mark Rothkosky
*Attorney, Agent, or Firm*—Akin, Gump, Strauss, Hauer & Feld, L.L.P.

[57] ABSTRACT

Disclosed is an alkaline storage battery which exhibit exceptional charge/discharge and cycle life characteristics by improved current collection and active material retention of the electrode substrate. The electrode comprises a substrate composed of a conductive core material and fibrous nickel members unitary sintered on both surfaces of the conductive core material, and a layer of an active material filled into the substrate. The fibrous nickel members of the substrate are bent or curved at least at their tip ends inside the active material layer to retain the active material.

11 Claims, 4 Drawing Sheets

ALKALINE STORAGE BATTERY AND METHOD FOR PRODUCING AN ELECTRODE USED THEREFOR

BACKGROUND OF THE INVENTION

The present invention relates to an alkaline storage battery, more specifically an alkaline storage battery using a paste-type electrode and a method for producing the paste-type electrode for use in the alkaline storage battery.

With the advancement of handy communication equipment and personal computers, the scale of the market of alkaline storage batteries used for those apparatuses has been expanded. Recently, the demand for a light-weight and high capacity battery has been increased rapidly in those fields of art. Moreover, there is also an increasing demand for the alkaline storage battery as the power source for use in electric tools and auxiliary power sources for charging and discharging at a large current.

Methods for producing electrodes for use in alkaline storage batteries are roughly classified into two types; one is the process of producing an electrode called "sintered-type electrode" by applying a paste of a nickel powder kneaded with a viscosity improver onto the surface of a conductive core material called "punched metal", which is a perforated nickel plate or the like, then sintering the paste-applied conductive core material to form a sintered porous substrate, and impregnating it with an active material. The other is the process of forming the paste-type electrode by filling or applying a paste containing an active material into or onto a porous metal substrate such as foamed metal, nonwoven nickel cloth or the like, or a conductive core material such as punched metal, expanded metal or the like.

There is a proposed method for producing a substrate by implanting fibrous nickel on a wire stainless steel, compressing and sintering the whole to form a sintered substrate (Japanese Laid-Open Patent Publication Sho 61-293618). This method intends to solve the inconveniences of crack development in the sintered substrate and difficult control of the substrate thickness involved in the sintered-type electrode.

There is another proposal to use a carbon fiber duster composed of a piled basement layer including carbon fibers and a nap-raised part formed by napping the basement layer as a conductive material (i.e., substrate) for the electrode used in secondary batteries, particularly in a sodium-sulfur battery (Japanese Laid-Open Patent Publication Hei 8-144153).

As far as the nickel electrode is concerned which has poor active material conductivity, it includes a porous metal such as foamed metal, nonwoven nickel cloth, or the like as the substrate of the paste-type electrode. Those porous metal substrates exhibit poor charge/discharge characteristics at a large current because of a long course of current collection from the active material to the terminal serving as the current input/output port, compared to the sintered-type electrode with an arrangement of the conductive core material in the center of the substrate along its thickness. Furthermore, these substrates are low in substrate strength and active material retention, because they have, as a whole, large pore sizes compared to the sintered-type electrode. In the nickel electrode, repeated charging/discharging operations cause a significant change in the volume of the active material. At the same time, swelling of the electrode plate occurs due to absorption of an electrolyte into the electrode. Thus, in such electrode with low active material retention, electric contact between the substrate and active material particles is apt to be impaired, causing a significant deterioration of current collection of the electrode.

On the other hand, in a cadmium electrode and a hydrogen storage alloy electrode which have relatively high active material conductivity, two-dimensional core materials such as punched metal are used as the substrates. Such electrodes have been widely used that are prepared by applying a mixture of an active material with a conductive material, such as carbon powder or carbon fiber, for supplementing conductivity, and a binder for supplementing active material retention, onto a conductive core material. However, even those electrodes with an addition of a conductive material exhibit insufficient current collection when they are charged and discharged at a large current.

The use of two-dimensional conductive core materials such as punched metal in the nickel electrode has also been studied for long for reducing the manufacturing cost of electrodes. However, since no binders and conductive materials suitable for the nickel electrode have not been found to date, the nickel electrode remains poor in charge/discharge characteristics and cycle life characteristic by repeated charge/discharge operations. Under the situation, nickel electrodes using the two-dimensional conductive core material have not been put to practical use industrially.

The sintered-type electrode has better charge/discharge characteristics at a large current than the paste-type electrode, but the substrate used for the former has a low porosity compared to the porous substrate used for the latter, and is difficult to reduce its thickness. Therefore, the sintered-type electrode is lower in capacity per unit volume than the paste-type electrode. Furthermore, the sintered substrate has a drawback such that due to its smaller pore size than that of the paste-type electrode, it becomes necessary to impregnate the substrate with an active material salt solution several times before filling of a required amount of an active material into the substrate, making the manufacturing process time-consuming and laborious.

BRIEF SUMMARY OF THE INVENTION

The present invention was performed to solve the aforementioned problems by improving the electrode structure.

The primary object of the present invention is to provide an electrode for alkaline storage batteries with excellent charge/discharge characteristics which affords a capacity equivalent to that of the conventional paste-type electrode and has been improved in active material retention and current collection.

Another object of the present invention is to provide a method for producing such electrode.

The present invention provides an electrode comprising a substrate composed of a conductive core material made of a metal sheet, a wire net or the like and fibrous nickel members unitary sintered on both surfaces of the conductive core material, and a layer of an active material filled into the substrate, the fibrous nickel members of the substrate having at least tip ends being bent or curved inside the layer of the active material so as to retain the active material.

The alkaline storage battery in accordance with the present invention includes the above-mentioned electrode for at least either positive electrode or negative electrode.

In a preferred mode of the present invention, the ratio of fibrous nickel members per unit area on the horizontal cross-section of the substrate, i.e., the surface density of fibrous nickel members is higher on the surface than in the center of the electrode along its thickness.

In another preferred mode of the present invention, the interval between the fibrous nickel members is narrower on the surface where they are being bent or curved than in the center of the electrode.

In still another preferred mode of the present invention, the fibrous nickel members in the electrode are a mixture of fibrous members with varied lengths.

In a further preferred mode of the present invention, most of the fibrous nickel members in the electrode are integrated with each other in plural units in the vicinity of their tip ends.

The present invention also provides a method for producing such electrode comprising the steps of applying an adhesive onto both surfaces of a conductive core material; implanting resin fibers on the adhesive-coated conductive core material; coating metallic nickel on the respective surfaces of the conductive core material and the resin fibers bonded thereto; heating the whole to remove resin fibers and the adhesive by thermal decomposition; sintering the metallic nickel covering the respective surfaces of the conductive core material and the resin fibers to form an electrode substrate; pressing the resultant substrate to adjust its thickness primarily; filling an active material into the substrate; and pressing additionally the resultant active material-filled substrate to adjust its thickness to a desired thickness.

For implanting the resin fibers by bonding them to the conductive core material having been applied with an adhesive, the use of the so-called electrostatic implantation, where a pile of resin fibers is supplied to a conductive core material vertically by electrostatic attraction so as to embed and fix the tip ends of the fibers in an adhesive, is preferable.

For coating metallic nickel on the respective surfaces of the conductive core material and the resin fibers having been implanted thereon, a combination of electroless plating and the subsequent electrolytic plating after activating the surfaces of the conductive core material and the resin fibers is preferable.

The heating step for removing the resin fibers and the adhesive by thermal decomposition is performed in the atmosphere normally, but may be performed in an inert-gaseous atmosphere. The step of sintering the nickel covering the surfaces of the conductive core material and the resin fibers to form an electrode substrate is preferably performed in a reducing atmosphere containing hydrogen gas.

In filling an active material into the substrate, it is preferable to fill a paste of an active material, more desirably a paste of a mixture prepared by mixing an active material with a conductive agent and a binder into the substrate. In this method, the use of preliminary pressing of the substrate so as to make its thickness 1.5— to threefold the final thickness of the electrode to be produced and the subsequent filling of an active material paste facilitates uniform charge of the active material.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

The present invention is directed to an alkaline storage battery comprising a positive electrode, a negative electrode, a separator and an alkaline electrolyte, wherein at least one of the positive electrode and the negative electrode comprises a substrate composed of a conductive core material and fibrous nickel members unitary sintered on both surfaces of the conductive core material, and a layer of an active material filled into the substrate, the fibrous nickel members of the substrate having at least tip ends being bent or curved inside the active material layer.

The conductive core material used in the present invention is preferably one of a nickel plate, a nickel-plated iron plate, a perforated plate prepared by perforating those plates, and a nickel wire net. Of those, a sheet or a plate with or without apertures is suitable in consideration of industrial mass productivity.

In the electrode having an active material filled into the electrode substrate composed of a conductive core material and fibrous nickel members unitary sintered on both surfaces of the conductive core material, when the fibrous nickel members stand erect perpendicular to the core material inside the active material layer, current collection by the substrate decreases in the direction parallel to the conductive core material. As a result, electric resistance between the active material, particularly that on the surface of the electrode, and the conductive core material is elevated, with an increase of electrode polarization.

In view of the above, the present invention has adopted such method that a substrate prepared by implantation of fibrous nickel members on a core material is pressed to adjust its thickness and bend at least the tip ends of the fibrous members fibers. Inside the electrode prepared with the substrate thus produced, the fibrous nickel members having been bent or curved at their tip ends or at most part thereof wind around the active material so as to ensure firm retention of the active material. Particularly, since the fibrous nickel members are bent or curved at their tip ends or at most part thereof, the surface density of the fibrous nickel members becomes higher in the surface layer than in the center of the electrode along the thickness of the electrode and the interval between the fibrous nickel members becomes narrow. As a result, the electric resistance between the active material located in the surface layer of the electrode and the conductive core material decreases, which minimizes polarization of the electrode, resulting in improved charge/discharge characteristics of the electrode. Furthermore, improved active material retention in the surface layer of the electrode minimizes separation of the active material even when the electrode is charged and discharged repeatedly, which ameliorates the cycle life characteristic of the electrode.

When the fibrous nickel members having been implanted on the electrode substrate is a mixture of fibrous nickel members with varied lengths, the conductivity of the surface layer of the electrode can be improved more effectively.

Furthermore, such configuration of the fibrous nickel members that they are integrated with each other in plural units in the vicinity of their tip ends facilitates positioning of the fibrous nickel members oblique and parallel to the conductive core material, and the presence of additional current collection paths formed by the above configuration is effective for further improving the charge/discharge and cycle life characteristics of the electrode.

In the following, the present invention will be described more specifically referring to specific examples.

EXAMPLE 1

A 60 μm-thick nickel-plated iron punched metal having an aperture of 1 mm diameter with a hole area rate of 42% was applied with a phenolic adhesive (20% solids) by spraying it on both surfaces thereof by adjusting the applying amount to 50 g/m$^2$. Subsequently, before the adhesive became dried, with a pile of rayon fibers of 30 μm diameter and 2 mm length being dropped onto the metal surfaces through a filter equipped with an electrode, a voltage of 70 kV was applied between the electrode of the filter and the punched metal so as to make the former become positive and the latter negative. In this way, the positively charged rayon fibers were flapped and implanted on the surface of the punched metal by electrostatic attraction.

Then, after the adhesive was cured by drying the punched metal for 10 min at 120° C., a 0.5 μm-thick nickel-phosphor alloy was coated on the surfaces of the rayon fibers and punched metal by electroless plating. The nickel-phosphor alloy contained 8 wt % of phosphor. Subsequently, electrolytic nickel plating was performed in an electrolytic plating Watt bath at a current density of 10 A/dm$^2$ by adjusting the weight of nickel to be plated to 300 g/m$^2$.

Thereafter, the whole was baked for 5 min at 700° C. in the air to remove the phenolic adhesive and rayon fibers by thermal decomposition. Then, the resultant was heated at 1000° C. for 5 min in a gaseous stream consisting of nitrogen and hydrogen gases (1:1 in volume) to sinter the punched metal and nickel fibers, the latter being produced during the process of thermal decomposition of the rayon fibers coated with nickel plating. In this way, a substrate "a" of the present invention was produced. The substrate "a" thus produced had a thickness of 4 mm. The substrate "a" was pressed primarily by passing it through a pair of rollers in order to adjust its thickness to 1.4 mm.

Figure 1:
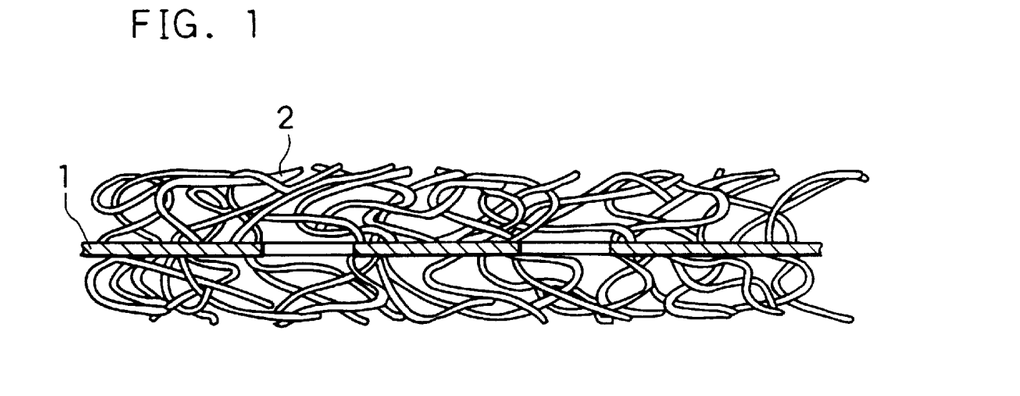
FIG. 1 is a schematic representation of the cross-section of an electrode substrate in accordance with one embodiment of the present invention.

FIG. 1 is a schematic representation of the cross-section of the substrate "a" with the adjusted thickness. In the figure, numeral 1 designates a nickel-plated iron punched metal. Numeral 2 designates a hollow nickel fiber which is a product of thermal decomposition of the rayon fiber as the core. As is evident from the figure, all the nickel fibers are bent or curved at the tip ends or in the middle and entangled with each other on the surface of the substrate due to pressing using rollers. The surface density of nickel fibers is higher on the surface than in the middle and root of the nickel fibers.

Then, the substrate "a" was compressed at a predetermined position using a 5 mm square metal die to a thickness about 0.2 mm to form a segment for lead attachment where no active material can be charged.

Figure 2:
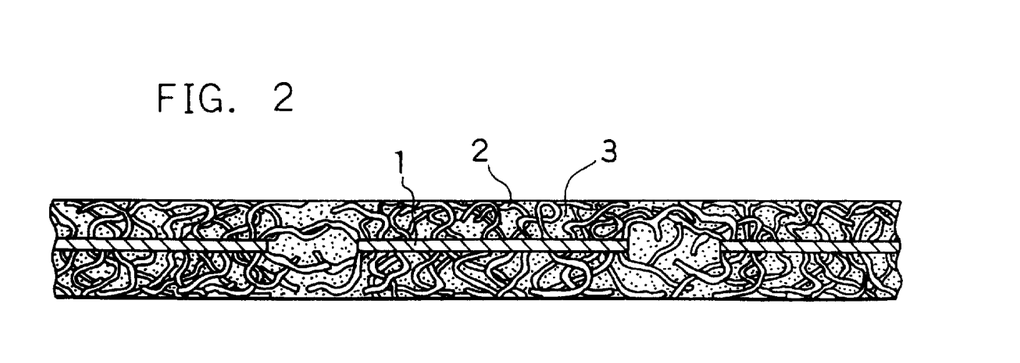
FIG. 2 is a magnification of the cross-section of an electrode prepared with the electrode substrate of FIG. 1.

After that, water was added to commercially available nickel hydroxide (90 parts by weight) and cobalt hydroxide (10 parts by weight) and the mixture was kneaded to form a paste. At that time, the amount of water was adjusted so as to make a paste containing water by 30%. The paste thus obtained was filled into the substrate "a" by spraying it on the substrate surface through a nozzle. The paste-filled substrate was then dried for 30 min at 90° C. and pressed again using rollers to adjust its thickness to 0.7 mm which is a desired final electrode thickness. FIG. 2 is a schematic representation of the cross-section of the electrode thus obtained. An active material 3 filled is retained by fibers 2 which are bent or curved and entangled with each other on the surface of the substrate. At the same time, the substrate surface prevents the active material from separating or dropping off from the substrate with certainty because it has been increased in surface density of nickel fibers.

The active material-filled substrate was then cut to a sheet of 35 mm width and 110 mm length, and a nickel lead plate was spot-welded at the predetermined position with no active material filled, which gave a nickel electrode. The nickel electrode has a capacity of about 1600 mAh.

A hydrogen storage alloy electrode was combined with this nickel electrode as the negative electrode. The hydrogen storage alloy electrode was produced as follows:

A hydrogen storage alloy represented by the formula MmNi$_{3.55}$Mn$_{0.4}$Al$_{0.3}$Co$_{0.75}$ was pulverized into powders of 50 μm or less, and the alloy powders were activated by immersing them in a 31% potassium hydroxide aqueous solution at 80° C. for 1 hour to remove an oxidized film formed on the surface of the alloy powders. To the activated powders, a 1.5 wt % aqueous solution of carboxymethylcellulose was added to form a paste, which was then filled into a foamed nickel sheet, dried for 30 min at 90° C. and pressed to have a thickness of 0.4 mm. Subsequently, the nickel sheet was coated with a 5 wt % aqueous dispersion of a fluorocarbon resin, dried and cut to have a width of 35 mm and a length of 145 mm, which gave a hydrogen storage alloy electrode.

Figure 3:
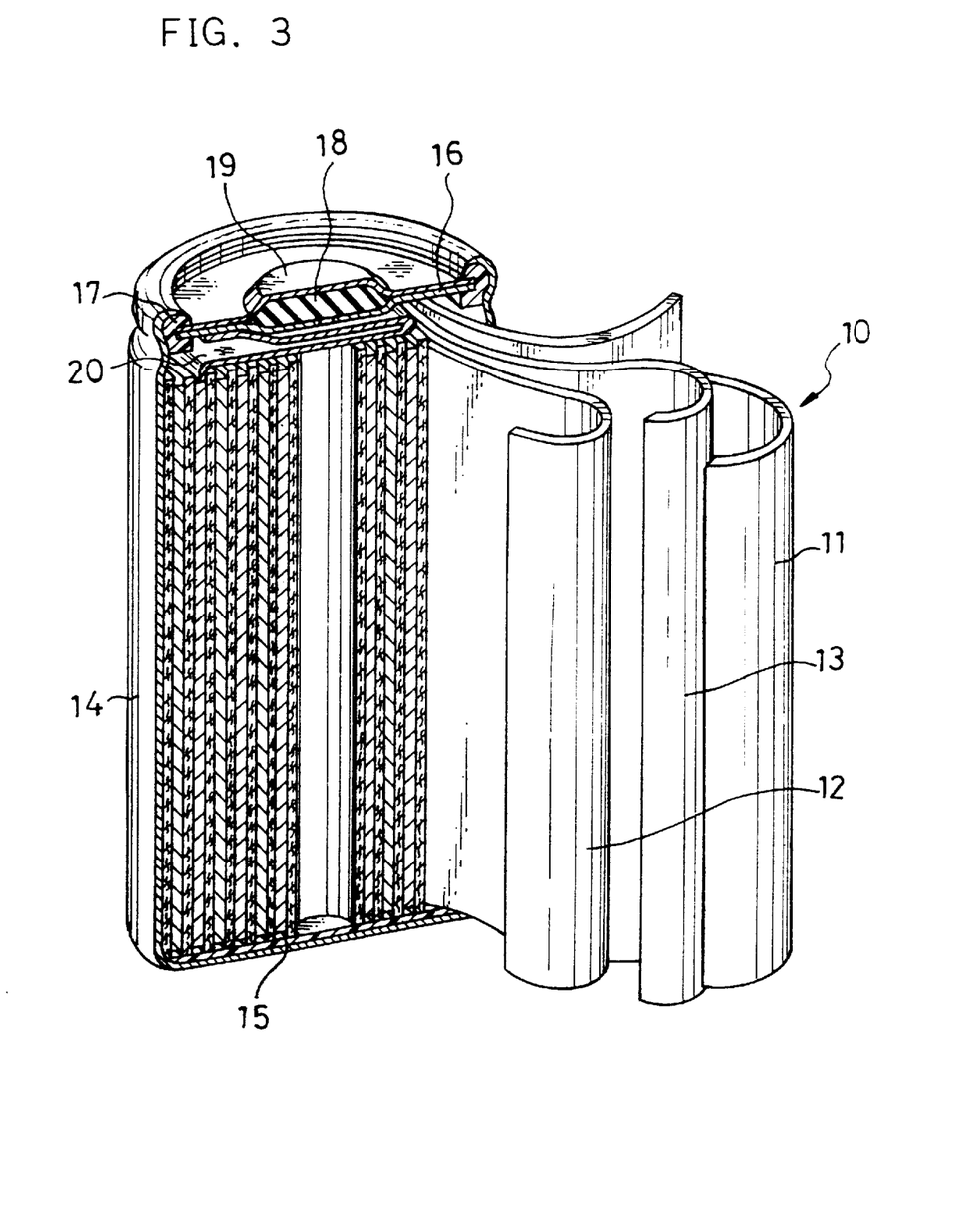
FIG. 3 is a partly cut-out broken perspective view of a battery using the electrode of FIG. 2.

A combination of the nickel electrode and the hydrogen storage alloy electrode was spirally rolled up with a separator of a nonwoven sulfonated polypropylene cloth interposed therebetween, and housed in a 4/5 A size battery case. Then, the battery case was filled with a predetermined amount of an electrolyte prepared by dissolving lithium hydroxide at 30 g/l in a potassium hydroxide aqueous solution having a specific gravity of 1.30 and an opening of the case was sealed with a sealing plate having a positive terminal fixed thereto. This gave a sealed nickel-metal hydride storage battery as shown in FIG. 3. In this way, a battery "A" in accordance with the present invention was produced.

FIG. 3 shows a sealed nickel-metal hydride storage battery assembled in the manner as described above. An electrode assembly 10 comprises a hydrogen storage alloy electrode 11, a nickel electrode 12 and a separator 13. A nickel-plated iron battery case 14 accommodates the electrode assembly 10 and an insulator plate 15 placed on the inside bottom of the battery case 14. A lead for the hydrogen storage alloy electrode (not shown) is welded to the battery case. An opening of the battery case 14 is sealed gas- and liquid-tightly with a sealing plate 16 and a gasket 17. The sealing plate 16 is provided with a rubber valve 18 and a cap 19 for holding the rubber valve on the sealing plate. A lead 20 for the nickel electrode 12 is welded to the sealing plate 16.

EXAMPLE 2

A 60 μm-thick nickel-plated iron punched metal having an aperture of 1 mm diameter with a hole area rate of 42% was applied with a phenolic adhesive (20% solids) by spraying it on both surfaces thereof by adjusting the applying amount to 50 g/m². Subsequently, before the adhesive became dried, with a mixture of 80 parts by weight of rayon fibers of 30 μm diameter and 2 mm length and 20 parts by weight of rayon fibers of 30 μm diameter and 4 mm length being dropped onto the metal surfaces through a filter equipped with an electrode, a voltage of 70 kV was applied between the electrode of the filter and the punched metal by making the former positive, thereby flapping and implanting the positively charged rayon fibers on the surface of the punched metal by electrostatic attraction, as in the aforementioned Example 1.

Then, after the adhesive was cured by drying the punched metal for 10 min at 120° C., a 0.5 μm-thick nickel-phosphor alloy was coated on the surfaces of the rayon fibers and punched metal by electroless plating. Subsequently, electrolytic nickel plating was performed in an electrolytic plating Watt bath at a current density of 10 A/dm² by adjusting the weight of nickel to be plated to 300 g/m².

Figure 4:
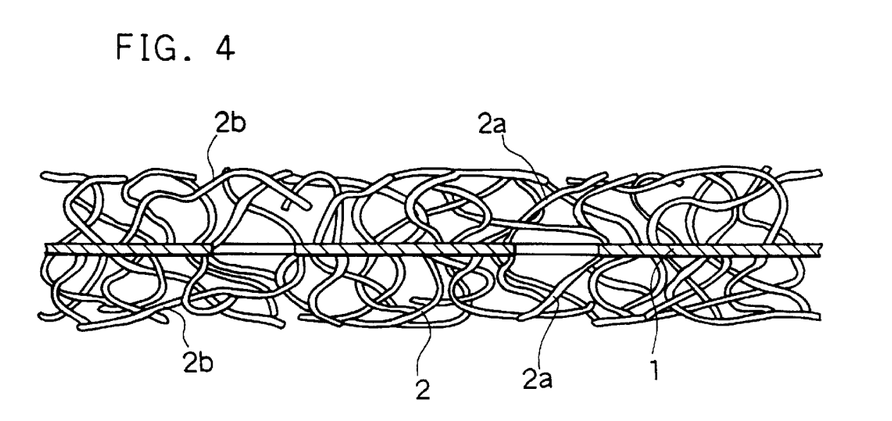
FIG. 4 is a schematic representation of the cross-section of an electrode substrate in accordance with another embodiment of the present invention.

Thereafter, the whole was baked for 5 min at 700° C. in the air to remove the phenolic adhesive and rayon fibers by thermal decomposition. Then, the resultant was heated at 1000° C. for 5 min in a gaseous stream consisting of nitrogen and hydrogen gases (1:1 in volume) to sinter the punched metal and nickel fibers. In this way, another substrate "b" of the present invention was produced. The substrate "b" thus produced had a thickness of about 6 mm. The substrate "b" was then pressed primarily in order to adjust its thickness to 1.4 mm. FIG. 4 is a schematic representation of the cross-section of the substrate "b" with the adjusted thickness.

Figure 5:
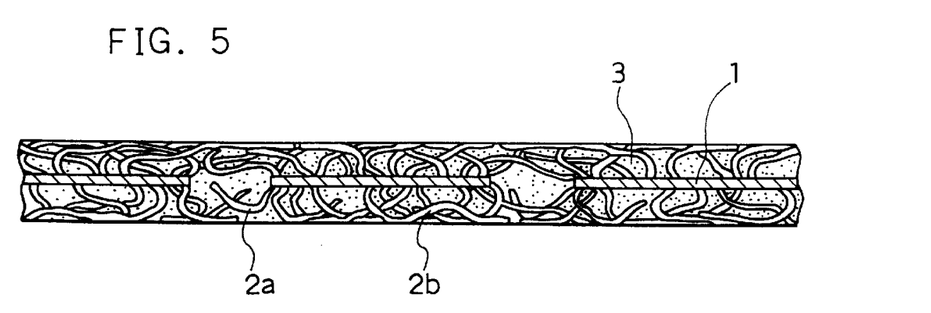
FIG. 5 is a magnification of the cross-section of an electrode prepared with the electrode substrate of FIG. 4.

Then, the substrate was filled with a paste of a mixture of nickel hydroxide and cobalt hydroxide, dried and then pressed again to have a final thickness of 0.7 mm in the same manner as in Example 1. FIG. 5 shows a schematic view of the cross-section of the substrate "b" having been filled with an active material in this way. In FIG. 4 and FIG. 5, numeral 2a represents the longer nickel fiber and 2b the shorter nickel fiber.

Using th e substrate "b", another nickel electrode was produced and assembled into a battery "B" of this example in the same manner as in Example 1.

EXAMPLE 3

A 60 μm-thick nickel-plated iron punched metal having an aperture of 1 mm diameter with a hole area rate of 42% was applied with a phenolic adhesive (20% solids) by spraying it on both surfaces thereof by adjusting the applying amount to 50 g/m². Subsequently, before the adhesive became dried, with a pile of rayon fibers of 30 μm diameter and 2 mm length being dropped onto the metal surfaces through a filter equipped with an electrode, a voltage of 70 kV was applied between the electrode of the filter and the punched metal so as to implant the rayon fibers on the surface of the punched metal by electrostatic attraction, as in Example 1.

Then, after the adhesive was cured by drying the punched metal for 10 min at 120° C., rayon fibers not bonded to the punched metal were shaken off using a roll brush. Subsequently, a phenolic adhesive (5% solids) was applied again by spraying it on the surface of a layer composed of rayon fibers by adjusting the applying amount of the adhesive to 10 g/m². Application of the adhesive by spraying caused most of the rayon fibers to swing so that neighboring several fibers were integrated with each other in the vicinity of their tip ends.

For curing the adhesive, the punched metal was heated again for another 10 min at 120° C., followed by coating the 0.5 μm-thick nickel-phosphor alloy as used in the above examples on the surfaces of the rayon fibers and punched metal by electroless plating. Subsequently, electrolytic nickel plating was performed in an electrolytic plating Watt bath at a current density of 10 A/dm² by adjusting the amount of nickel to be plated to 300 g/m².

Figure 6:
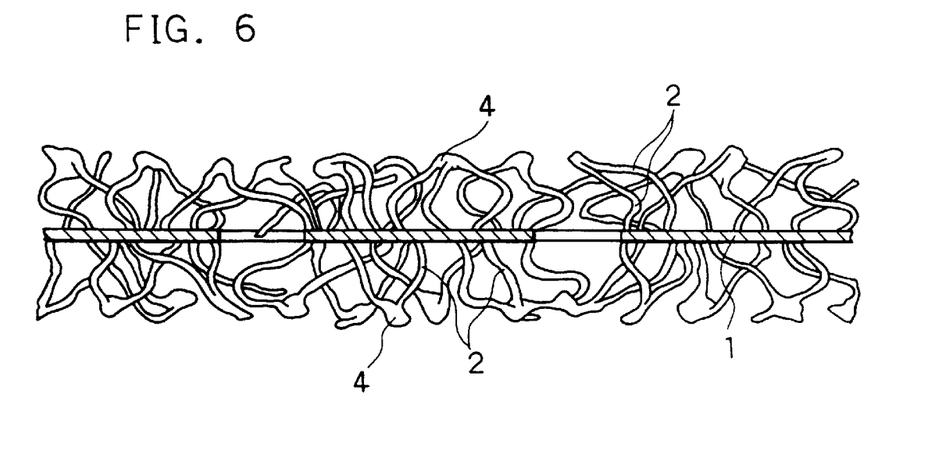
FIG. 6 is a schematic representation of the cross-section of an electrode substrate in accordance with still another embodiment of the present invention.

Thereafter, the whole was baked for 5 min at 700° C. in the air to remove the phenolic adhesive and rayon fibers by thermal decomposition. Then, the resultant was heated at 1000° C. for 5 min in a gaseous stream consisting of nitrogen and hydrogen gases (1:1 in volume) to sinter the punched metal and the nickel fibers. In this way, another substrate "c" of the present invention was produced. The substrate "c" thus produced had a thickness of about 4 mm. Then, the substrate "c" was roll-pressed primarily to adjust its thickness to 1.4 mm. FIG. 6 is a schematic view of the cross-section of the substrate "c". In the figure, numeral 4 represents the place where several nickel fibers are integrated with each other in the vicinity of their tip ends.

Figure 7:
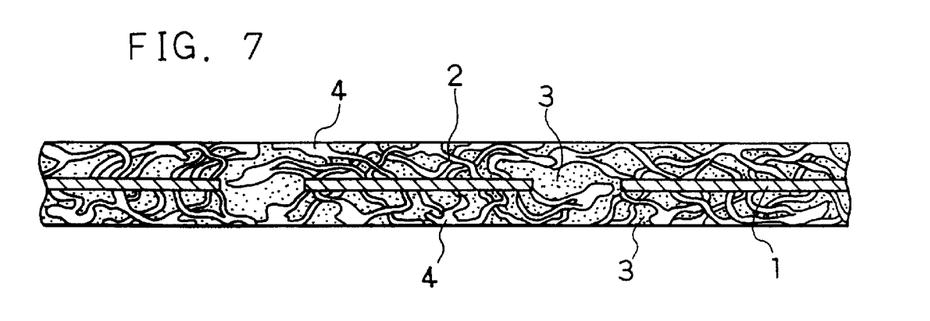
FIG. 7 is a magnification of the cross-section of an electrode prepared with the electrode substrate of FIG. 6.

Then, the substrate "c" was filled with an active material and pressed again to have a final thickness of 0.7 mm in the same manner as in Example 1. FIG. 7 is a schematic representation of the cross-section of the substrate "c" in the active material-filled and pressed state.

Using the substrate "c", another nickel electrode was produced and assembled into a battery "C" of this example in the same manner as in Example 1.

Comparative Example

For comparison, a substrate and an electrode were produced in accordance with the invention disclosed in EPA 0 723 307.

A 60 μm-thick nickel-plated iron punched metal having an aperture of 1 mm diameter with a hole area rate of 42% was applied with a phenolic adhesive (20% solids) by spraying it on both surfaces thereof by adjusting the applying amount to 50 g/m². Subsequently, before the adhesive became dried, with the rayon fibers of 30 μm diameter and 0.7 mm length being dropped onto the metal surfaces through a filter equipped with an electrode, a voltage of 70 kV was applied between the electrode of the filter and the punched metal so as to implant the rayon fibers on the surface of the punched metal by electrostatic attraction, as in Example 1.

Then, after the adhesive was cured by drying the punched metal for 10 min at 120° C., a 0.5 μm-thick nickel-phosphor alloy as used in the previous examples was coated on the surfaces of the rayon fibers and punched metal by electroless plating. Subsequently, electrolytic nickel plating was performed in an electrolytic plating Watt bath at a current density of 10 A/dm² by adjusting the amount of nickel to be plated to 300 g/m².

Thereafter, the whole was baked for 5 min at 700° C. in the air to remove the phenolic adhesive and rayon fibers by thermal decomposition. Then, the resultant was heated at 1000° C. for 5 min in a gaseous stream consisting of nitrogen and hydrogen gases (1:1 in volume) to sinter the punched metal and nickel fibers. In this way, a substrate "d" of a comparative example was produced. The substrate "d" thus produced had a thickness of about 1.5 mm.

Using the substrate "d", another nickel electrode was produced and assembled into a battery "D" in the same manner as in Example 1.

Evaluation of the discharge performance was made in the batteries "A", "B", "C" and "D". Those batteries were charged at 1 CmA for 72 min, and then discharged at different currents of 0.2 CmA, 1 CmA and 3 CmA until their terminal voltage dropped to 1.0 V in order to determine the discharge capacity of the batteries. Table 1 lists the rate of compression of the substrates upon production of the respective electrodes, discharge capacities and mean discharge voltages in the respective batteries. The compression rate of the substrate is represented by the following formula:

Compression rate(%)=(electrode thickness/substrate thickness upon completion of sintering)×100.

In the table, the mean discharge voltages represent the mean values of the voltages measured every 60 sec for 1 sec when the batteries were discharged at 0.2 CmA, 1 CmA and 3 CmA until their terminal voltage dropped to 1.0 V after being charged at 1 CmA for 72 min. Three samples were used for testing the respective batteries.

TABLE 1

| Battery | Substrate compression rate (%) | Discharge capacity (mean discharge voltage) | | |
|---|---|---|---|---|
| | | Discharge at 0.2 CmA | Discharge at 1 CmA | Discharge at 3 CmA |
| A | 17.5 | 1.58 Ah (1.23 V) | 1.40 Ah (1.18 V) | 1.05 Ah (1.10 V) |
| B | 11.7 | 1.60 Ah (1.24 V) | 1.43 Ah (1.19 V) | 1.12 Ah (1.12 V) |
| C | 17.5 | 1.60 Ah (1.24 V) | 1.52 Ah (1.21 V) | 1.20 Ah (1.15 V) |
| D | 46.7 | 1.58 Ah (1.22 V) | 1.34 Ah (1.15 V) | 0.94 Ah (1.06 V) |

As is clearly understood from Table 1, the ascending order of improvement in the discharge performance is Battery "D" of the comparative example, Battery "A", "B" and "C" of the present invention.

In the battery "C", the configuration of mutual physical bonding of the nickel fibers at their tip ends ensures most tight horizontal interconnections between the fibers almost in parallel with the conductive core material, even when the fibers are present inside the electrode being buried in the active material layer. This is considered to have minimized electric resistance between the conductive core material and the active material, resulting in a manifestation of the highest discharge capacity by the battery "C". The characteristics are improved in the ascending order of Battery "D", Battery "A" and Battery "B". The estimated reason for this result is that with the increase in substrate compression rate, the area of contact between the nickel fibers, which are present horizontal to the surface of the conductive core material inside the electrode, is enlarged, contributing to the improvement of the conductivity between the substrate and the active material.

Next, each 3 of the batteries "A", "B", C and "D" were tested by repeated charge and discharge cycles where charging was performed at a current of 0.5 CmA at 20° C. for 3 hours, followed by discharging at a current of 1 CmA until the terminal voltage dropped to 0.9 V. The cycle number counted upon a decrease in the discharge capacity down to 60% of the initial capacity was regarded as the cycle life of the battery. Table 2 shows a comparison of the cycle life between the batteries.

TABLE 2

| Battery | Cycle life (cycles) |
|---|---|
| A | 378, 362, 375 |
| B | 390, 403, 398 |
| C | 453, 450, 448 |
| D | 280, 237, 265 |

Battery "C" also exhibits the most excellent cycle life, followed by Battery "B", "A" and "D".

In the foregoing examples, a punched metal was used for the conductive core material, but the present invention is not limited to this and a similar effect can be obtained even with the use of a nonperforated metal plate, wire cloth, expanded metal and the like as the core material. As the resin fiber, other resin fibers, such as acrylonitrile fiber, nylon fiber and the like, may also be used in addition to the rayon fiber.

In the foregoing examples, the substrates in accordance with the present invention were used in the nickel electrodes, but they can produce similar improving effects on the charge/discharge performance and cycle life characteristic even when they are applied to the cadmium electrode and hydrogen storage alloy electrode.

According to the present invention, the current collection by the substrate is improved whereby the charge/discharge performance of the electrode and the alkaline storage battery including such electrode increases, and the active material retention of the electrode is improved, elongating the cycle life of the battery including the electrode by repeated charge/discharge operations.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. An alkaline storage battery comprising a positive electrode, a negative electrode, a separator and an alkaline electrolyte, wherein
at least one of said positive electrode and negative electrode comprises a substrate composed of a conductive core material and fibrous nickel members unitary sintered on both surfaces of said conductive core material, and a layer of an active material filled into said substrate, said fibrous nickel members of said substrate having at least tip ends being bent or curved inside said layer of the active material so as to retain said active material.

2. The alkaline storage battery in accordance with claim 1, wherein said conductive core material is one of a nickel plate, a nickel-plated iron plate, a perforated plate prepared by perforating said plates, and a nickel wire net.

3. The alkaline storage battery in accordance with claim 1, wherein said fibrous nickel members are a mixture of fibrous members with varied lengths.

4. The alkaline storage battery in accordance with claim 1, wherein most of said fibrous nickel members are integrated with each other in plural units in the vicinity of the tip ends thereof.

5. An alkaline storage battery comprising a positive electrode, a negative electrode, a separator and an alkaline electrolyte, wherein at least one of said positive electrode and negative electrode comprises a substrate composed of a conductive core material and fibrous nickel members unitary sintered on both surfaces of said conductive core material, and a layer of an active material filled into said substrate, said fibrous nickel members of said substrate being higher in surface density on the surface of the electrode than in the center of the electrode along its thickness.

6. The alkaline storage battery in accordance with claim 5, wherein said fibrous nickel members are a mixture of fibrous nickel members with varied lengths.

7. The alkaline storage battery in accordance with claim 5, wherein said fibrous nickel members have tip ends and wherein most of said fibrous nickel members are integrated with each other in plural units in the vicinity of the tip ends thereof.

8. A method for producing an electrode for alkaline storage batteries, said method comprising the steps of:

applying an adhesive onto both surfaces of a conductive core material, implanting resin fibers on the adhesive-coated conductive core material, coating metallic nickel on the respective surfaces of said conductive core material and said resin fibers bonded thereto, heating the whole to remove said resin fibers and said adhesive by thermal decomposition, sintering said metallic nickel covering the respective surfaces of said conductive core material and said resin fibers to form an electrode substrate, pressing the resultant substrate primarily to adjust its thickness, filling an active material into said substrate, and pressing the resultant active material-filled substrate again so as to adjust its thickness to a desired thickness.

9. The method for producing an electrode for alkaline storage batteries in accordance with claim 8, wherein said resin fibers have tip ends, and further comprising the step of joining plural resin fibers which have been implanted in the previous implanting step by bonding them with each other at the tip ends thereof.

10. The method for producing an electrode for alkaline storage batteries in accordance with claim 8, wherein the thickness of the substrate after being pressed primarily is 1.5 to threefold the thickness of the substrate after being pressed again.

11. An alkaline storage battery comprising the electrode produced by the method in accordance with claim 8.

* * * * *